United States Patent
Bruchmann et al.

(10) Patent No.: US 7,893,184 B2
(45) Date of Patent: Feb. 22, 2011

(54) METHOD FOR PRODUCING DENDRITIC OR HYPERBRANCHED POLYURETHANES

(75) Inventors: Bernd Bruchmann, Freinsheim (DE); Jean-Francois Stumbe, Strasbourg (FR)

(73) Assignee: BASF Aktiengesellschaft, Ludwigshafen (DE)

( * ) Notice: Subject to any disclaimer, the term of this patent is extended or adjusted under 35 U.S.C. 154(b) by 680 days.

(21) Appl. No.: 10/556,132

(22) PCT Filed: May 14, 2004

(86) PCT No.: PCT/EP2004/005215

§ 371 (c)(1),
(2), (4) Date: Nov. 15, 2006

(87) PCT Pub. No.: WO2004/101624

PCT Pub. Date: Nov. 25, 2004

(65) Prior Publication Data

US 2007/0106046 A1    May 10, 2007

(30) Foreign Application Priority Data

May 16, 2003   (DE)   ............... 103 22 401

(51) Int. Cl.
*C08G 18/08*  (2006.01)
(52) U.S. Cl. ............ 528/53; 528/59; 528/85; 528/67; 528/49; 528/61; 528/82; 252/182.22; 252/182.26; 560/25; 560/26; 560/115; 560/158; 560/330; 560/336; 560/355; 560/358; 560/359; 560/360; 564/32; 564/47; 564/48; 564/57; 564/501; 525/182.26
(58) Field of Classification Search ............ 525/182.26; 560/357, 330, 25, 26, 115, 158, 336, 355, 560/358, 359, 360; 528/82, 61, 49, 53, 67, 528/85, 59; 252/182.26, 182.22; 564/501, 564/32, 47, 48, 57
See application file for complete search history.

(56) References Cited

U.S. PATENT DOCUMENTS

| | | | | |
|---|---|---|---|---|
| 5,977,284 A | * | 11/1999 | Reich et al. | 528/53 |
| 6,376,637 B1 | * | 4/2002 | Bruchmann et al. | 528/60 |
| 2003/0225239 A1 | * | 12/2003 | Nakamura et al. | 528/59 |

FOREIGN PATENT DOCUMENTS

| | | | |
|---|---|---|---|
| EP | 0 046 088 | 2/1982 | |
| EP | 0 297 344 | 1/1989 | |
| EP | 1 026 185 | 8/2000 | |
| EP | 1 167 413 | 1/2002 | |
| JP | 2000-063513 | 2/2000 | |
| WO | 97/02304 | 1/1997 | |
| WO | WO-0116203 | * 3/2001 | 528/59 |

OTHER PUBLICATIONS

Spindler et al., "Synthesis and Characterization of Hyperbranched Polyurethanes Prepared from Blocked Isocyanate Monomers by Step-Growth Polymerization", Macromolecules, 26, pp. 4809-4813 (1993).

* cited by examiner

*Primary Examiner*—Milton I Cano
*Assistant Examiner*—Michael Leonard
(74) *Attorney, Agent, or Firm*—Oblon, Spivak, McClelland, Maier & Neustadt, L.L.P.

(57) ABSTRACT

Dendritic or hyperbranched polyurethanes are prepared by 1) reacting diols or polyols having at least one tertiary nitrogen atom and at least two hydroxyl groups of differing reactivity toward isocyanate groups with diisocyanates or polyisocyanates to form an addition product, with the diols or polyols and diisocyanates or polyisocyanates being selected so that the addition product has, on average, one isocyanate group and more than one hydroxyl group or one hydroxyl group and more than one isocyanate group, 2) converting the addition product from step 1) into a polyaddition product by intermolecular reaction of the hydroxyl groups with the isocyanate groups, and with a reaction with a compound containing at least two hydroxyl groups, mercapto groups, amino groups or isocyanate groups also being able to be carried out first, 3) if desired reacting the polyaddition product from step 2) with a compound containing at least two hydroxyl groups, mercapto groups, amino groups or isocyanate groups.

14 Claims, No Drawings

METHOD FOR PRODUCING DENDRITIC OR HYPERBRANCHED POLYURETHANES

The present invention relates to a process for preparing dendritic or hyperbranched polyurethanes, to the dendritic or hyperbranched polyurethanes obtainable in this way and to their use.

The preparation of dendritic and hyperbranched polyurethanes is known per se. For example in "Macromolecules" 1993, 26, pages 4809 to 4813, Spindler and Frechet describe the synthesis and characterization of hyperbranched polyurethanes which are obtained from capped isocyanate monomers by stepwise polymerization. 3,5-Bis((benzoxycarbonyl)imino)benzyl alcohol is used as monomer. This monomer, which can be regarded as phenol-capped diisocyanatobenzyl alcohol is used in the reaction. Disadvantages of the process are the lack of industrial availability of the starting monomer and the complicated and costly preparation of the polyurethanes. In addition, the necessity of eliminating phenol results in problems with regard to toxicity and industrial hygiene.

A process for preparing highly functionalized polyurethanes using other protective groups is described in WO 97/02304. Isocyanate components used are, for example, customary compounds such as diphenylmethane diisocyanate (MDI), tolylene diisocyanate (TDI), p-phenylene diisocyanate, hexamethylene diisocyanate (HDI) or isophorone diisocyanate (IPDI). As polyol component, it is possible to use glycerol ketals or trimethylolpropene ketals, hydroxyalkyloxazolidines or dialkanolamines. It is stated that in the case of the dialkanolamines, the NH group reacts preferentially, so that capping of the OH groups can be dispensed with. Otherwise, monomers containing an NCO group and two protected OH groups are produced in one of the first reaction steps for preparing the dendrimers. Addition of these monomers onto a starter molecule bearing OH or NH groups and setting free of the OH groups gives polyurethane polyols which grow by divergent (shell-like) addition of further units to form dendritic structures. Modification of this reaction scheme makes it possible for the dendrimers to be produced by the convergent method, i.e. generation of the dendritic branches and subsequent attachment to a core. Highly branched polyurethanes can also be prepared from the monomers mentioned by means of an intermolecular reaction. However, the use of protective group chemistry is complicated and costly.

EP-A-1 026 185 relates to dendritic and highly branched polyurethanes which are obtained by reacting diisocyanates and/or polyisocyanates with compounds having at least two groups which are reactive toward isocyanates, with at least one of the reactants having functional groups of differing reactivity toward the other reactant and the reaction conditions being selected so that only particular reactive groups react with one another in each reaction step. In particular, diisocyanates and/or polyisocyanates having NCO groups of differing reactivity are used. Examples of such isocyanates are tolylene 2,4-diisocyanate, diphenylmethane 2,4'-diisocyanate, triisocyanato toluene, isophorone diisocyanate and others. As compounds having at least two groups which are reactive toward isocyanates, it is possible to use, inter alia, amino alcohols, amino diols and amino triols. It is once again stated that the reactivity of the amino group is significantly higher than that of the hydroxyl group in the reaction with isocyanate. Propylene glycol, glycerol, mercapto ethanol, ethanolamine, diethanolamine and tris(hydroxymethyl)aminomethane are mentioned as examples.

In the process described, reactivity differences in the starting components are utilized to build up defined structures via the selectivity. However, the polymers prepared by this process have relatively short distances between the functional groups of the repeating units, which can lead to problems in the compatibility with solvents or other polymers.

EP-A-1 167 413 describes polyfunctional polyisocyanate polyaddition products. To prepare them, at least bifunctional components which are reactive toward isocyanate groups are firstly reacted with diisocyanates or polyisocyanates in such a way that, on average, one isocyanate group and more than one group which is reactive toward isocyanate groups are present in the addition product. This addition product is then subject to an intermolecular addition reaction, followed by reaction of the polyaddition product obtained in this way with an at least bifunctional component which is reactive toward isocyanate groups. Among compounds having more than two groups which are reactive toward isocyanate groups, mention is made of, inter alia, glycerol, trimethylolmethane, trimethylolethane, trimethylolpropane, triethanolamine, triisopropanolamine, N-methyldiethanolamine and N-butyldiethanolamine. Possible diisocyanates and polyisocyanates are the above-described known aliphatic, cycloaliphatic and aromatic isocyanates.

The products obtained do not always have satisfactory compatibility and solubility with or in standard solvents and with water.

It is an object of the present invention to provide a simple and inexpensive process for preparing dendritic and hyperbranched polyurethanes, which can be carried out using readily available raw materials and without incorporation of protective groups and generates products which have improved compatibility and solubility with or in standard solvents and with or in water.

We have found that this object is achieved by a process for preparing dendritic or hyperbranched polyurethanes by 1) reacting diols or polyols having at least one tertiary nitrogen atom and at least two hydroxyl groups of differing reactivity toward isocyanate groups with diisocyanates or polyisocyanates to form an addition product, with the diols or polyols and diisocyanates or polyisocyanates being selected so that the addition product has, on average, one isocyanate group and more than one hydroxyl group or one hydroxyl group and more than one isocyanate group and with a reaction with a compound containing at least two hydroxyl groups or isocyanate groups also being able to be carried out initially, 2) converting the addition product from step 1) into an (intermolecular) polyaddition product by intermolecular reaction of the hydroxyl groups with the isocyanate groups, 3) if desired reacting the polyaddition product from step 2) with a compound containing at least two hydroxyl groups, mercapto groups, amino groups or isocyanate groups.

The invention also provides the dendritic or hyperbranched polyurethanes obtainable by this process and provides for their use as components for producing polyaddition or polycondensation polymers, coatings, paints and varnishes, adhesives, sealants, casting elastomers and foams and as phase compatibilizers, rheological aids, thixotropes, nucleating agents or as carriers for active compounds or as catalyst support.

According to the present invention, it has been found that the use of diols or polyols which have at least one tertiary nitrogen atom and at least two hydroxyl groups of differing reactivity toward isocyanate groups leads to dendritic or hyperbranched polyurethanes which can be prepared simply and inexpensively and display improved compatibility or solubility with or in standard solvents and with/in water.

These diols or polyols are reacted selectively with diisocyanates or polyisocyanates to give the dendritic or hyperbranched polyamino urethanes.

Dendrimers, arborols, starburst polymers and hyperbranched polymers are names for polymeric structures which have a branched structure and a high functionality. These structures have been described for many classes of polymeric compounds, for example for polyamines, polyamides, polyethers, polyesters, polyphenylenes or polysiloxanes in a number of variants. A comprehensive review of this field is given, for example, in E. Malmström and A. Hult, J. M. S.-Rev. Macromol. Chem. Phys., 1997, C 37(3), 555-579, in Dendritic Molecules, G. R. Newkome, C. N. Moorefield and F. Vögtle, Verlag Chemie, Weinheim 1996 and in Dendrimers and Dendrons, G. R. Newkome, C. N. Moorefield and F. Vögtle, Wiley-VCH Verlag, Weinheim 2001.

For the purposes of the present invention, dendritic polyaminourethanes are macromolecules which contain amino groups and urethane groups and are structurally and molecularly uniform and have branched molecular chains, known as dendrons, extending out from a core molecule. For the purposes of the present invention, the branched molecular chains (dendrons) themselves are classed as dendrimers.

For the purposes of the present invention, hyperbranched polyamino urethanes are uncrosslinked macromolecules which contain amino groups and urethane groups and are both structurally and molecularly nonuniform. They can, on the one hand, be made up of branches extending out from a central molecule in a manner analogous to dendrimers, but with a nonuniform chain length of the branches. On the other hand, they can also have a linear structure with functional side groups or else, as a combination of the two extremes, have both linear and branched parts of the molecule. Further information on the definition of dendritic and hyperbranched polymers may be found in: P. J. Flory, J. Am. Chem. Soc. 1952, 74, 2718 and H. Frey et al., Chem. Eur. J. 2000, 6, No. 14, 2499.

The term "hyperbranched" as used in the context of the present invention means that the degree of branching (DB), i.e. the mean number of dendritic linkages plus the mean number of end groups per molecule, is from 10 to 99%, preferably from 20 to 95%, particularly preferably from 20 to 90%.

The term "dendritic" as used in the context of the present invention means that the degree of branching is from 99.0 to 100%. The definition of the "degree of branching" is given in H. Frey et al., Acta Polym. 1997, 48, 30.

In the process of the present invention, an addition product having, on average, one isocyanate group and more than one hydroxyl group or one hydroxyl group and more than one isocyanate group is prepared first in step 1). The addition product preferably has one isocyanate group and from two or four, particularly preferably 2 or 3, in particular two, hydroxyl groups or one hydroxyl group and from two to four, particularly preferably two or three, in particular two isocyanate groups. This addition product is converted into an intermolecular polyaddition product by intermolecular reaction of the hydroxyl groups with the isocyanate groups in step 2).

In a subsequent, optional step 3), the polyaddition product obtained in this way can be reacted further with a compound containing at least two hydroxyl groups or isocyanate groups. This third reaction step corresponds to a convergent synthesis. The second and third steps can be carried out as described, for example, in EP-A-1 167 413 and EP-A-1 026 185.

Step 1) is carried out using diols or polyols which have at least one tertiary nitrogen atom and at least two hydroxyl groups of differing reactivity toward isocyanate groups. The differing reactivity toward isocyanate groups enables, for example, the reaction with isocyanate groups to be controlled in two stages so that firstly only the hydroxyl groups of higher reactivity are reacted and only in the following step are the hydroxyl groups having lower reactivity reacted. Accordingly, preference is given to only or predominantly the hydroxyl groups of the diols or polyols having the higher reactivity toward isocyanate groups being reacted with the isocyanate groups in step 1) and the hydroxyl groups of the diols or polyols having the lower reactivity toward isocyanate groups being reacted in step 2). For the purposes of the present invention, the expression "predominantly" means that at least 60%, preferably at least 70%, in particular at least 80%, of the hydroxyl groups of the diols or polyols having the higher reactivity are reacted in step 1).

The diols or polyols used in step 1) preferably have from 2 to 5, particularly preferably from 2 to 4, in particular 2 or 3, hydroxyl groups, with the hydroxyl groups having at least two different reactivities toward NCO groups. Thus, in a compound having three hydroxyl groups, two hydroxyl groups can have an identical or comparable reactivity. The reactivity differences should be sufficiently great for a two-stage selective reaction of the hydroxyl groups to be able to be achieved in practice.

The diols or polyols have at least one tertiary nitrogen atom. Preference is given to from 1 to 3, particularly preferably 1 or 2, in particular 1, tertiary nitrogen atom being present.

The diols or polyols used in step 1) are preferably obtained by Michael addition of compounds having at least one primary or secondary amino group and at least one hydroxyl group onto ethylenically unsaturated compounds bearing at least one hydroxyl group. As ethylenically unsaturated compounds, it is in principle possible to use all compounds of this type which can undergo a Michael addition with the amino alcohols. Appropriate compounds are known to those skilled in the art. For example, the ethylenically unsaturated compound can be selected from among (meth)acrylates of diols or polyols or from among vinyl alcohols and allyl alcohols. The ethylenically unsaturated compound is particularly preferably selected from among (meth)acrylates of $C_{2-20}$-diols, particularly preferably $C_{2-12}$-diols, in particular $C_{2-6}$-diols. The diol component can be linear or branched. Preference is given to primary or secondary diols or mixed primary/secondary diols.

The compounds having at least one primary or secondary amino group and at least one hydroxyl group which are used in the Michael addition preferably contain from 1 to 3, particularly preferably 1 or 2, in particular 1, primary or secondary amino group(s). In addition, they preferably have at least one, preferably from 1 to 3, in particular 1 or 2, hydroxyl group(s). The compounds are, in particular, aliphatic, aromatic or aromatic-aliphatic aminoalkanols which may be linear or branched. They preferably have from 2 to 50 carbon atoms, in particular from 2 to 20 carbon atoms.

Suitable Michael addition products are also described, for example, in DE-A-198 05 136. With regard to suitable reaction conditions, reference can likewise be made to this document.

Suitable starting materials for the preparation of these amino alcohols are, for example, aliphatic diamines, triamines or alkanolamines having primary and/or secondary NH groups or primary, secondary or tertiary OH groups. Examples which may be mentioned are ethylenediamine, propylenediamine, butylenediamine, hexamethylenediamine, isophoronediamine, toluenediamine, isopropanolamine, butanolamine, pentanolamine, hexanolamine and longer-chain alkanolamines, diethanolamine, dipropanolamine, dibutanolamine, diisopropanolamine, tris(hydroxymethyl)aminomethane and tris(hydroxyethyl)aminomethane. These monomers are reacted with molecules containing activated double bonds, for example with acrylic acid derivatives or vinyl compounds, to form the bifunctional or polyfunctional amino alcohols.

In one embodiment, the ethylenically unsaturated compound is a (meth)acrylate of an aliphatic diol which is reacted with an aliphatic aminoalkanol which has a primary or secondary amino group and one or two hydroxyl groups.

In a preferred embodiment, amino alcohols which have tertiary amino groups and also primary, secondary or tertiary OH groups within the molecule are produced in this way.

Particular preference is given to compounds having one tertiary amino group and OH groups of differing reactivity toward NCO groups, for example products having one primary OH group and one secondary OH group, one primary OH group and one tertiary OH group, one primary OH group and at least two secondary OH groups, one primary OH group and at least two tertiary OH groups, one secondary OH group and at least two primary OH groups or one tertiary OH group and at least two primary OH groups.

Very particular preference is given to compounds having a tertiary amino group and also one primary hydroxyl group and one secondary hydroxyl group, one primary hydroxyl group and at least two secondary hydroxyl groups or one secondary hydroxyl group and at least two primary hydroxyl groups.

It is also possible to use mixtures of the compounds mentioned.

The amino alcohols are subsequently reacted with diisocyanates or polyisocyanates to form the corresponding dendritic or hyperbranched structures. Possible diisocyanates and polyisocyanates are the aliphatic, cycloaliphatic and aromatic isocyanates known from the prior art. Suitable diisocyanates and polyisocyanates are described, for example, in EP-A-1 167 413, EP-A-1 026 185 and WO 97/02304. Preferred diisocyanates or polyisocyanates are diphenylmethane 4,4'-diisocyanate, mixtures of monomeric diphenylmethane diisocyanates and oligomeric diphenylmethane diisocyanates (polymeric MDI), tetramethylene diisocyanate, tetramethylene diisocyanate trimers, hexamethylene diisocyanate, hexamethylene diisocyanate trimers, isophorone diisocyanate trimer, 4,4'-methylenebis(cyclohexyl isocyanate), xylylene diisocyanate, tetramethylxylylene diisocyanate, dodecyl diisocyanate, lysine alkyl ester diisocyanate, where alkyl is $C_1$-$C_{10}$-alkyl, 2,2,4- or 2,4,4-trimethylhexamethylene 1,6-diisocyanate, 1,4-diisocyanatocyclohexane or 4-isocyanatomethyloctamethylene 1,8-diisocyanate.

According to the present invention, it is possible to use diisocyanates or polyisocyanates in which the isocyanate groups have the same reactivity or differing reactivities.

Particular preference is given to diisocyanates or polyisocyanates having NCO groups of differing reactivity, e.g. tolylene 2,4-diisocyanate (2,4-TDI), diphenylmethane 2,4'-diisocyanate (2,4'-MDI), triisocyanatotoluene, isophorone diisocyanate (IPDI), 2-butyl-2-ethylpentamethylene diisocyanate, 2-isocyanatopropylcyclohexyl isocyanate, 3(4)-isocyanatomethyl-1-methylcyclohexyl isocyanate, 1,4-diisocyanato-4-methylpentane, 2,4'-methylenebis(cyclohexyl diisocyanate) and 4-methylcyclohexane 1,3-diisocyanate (H-TDI).

Particular preference is also given to isocyanates whose NCO groups initially have the same reactivity but in which addition of an alcohol onto one NCO group induces a decrease in the reactivity of the second NCO group. Examples are isocyanates whose NCO groups are coupled via a delocalized electron system, for example phenylene 1,3- and 1,4-diisocyanate, naphthylene 1,5-diisocyanate, tolidine diisocyanate or tolylene 2,6-diisocyanate.

It is also possible to use, for example, oligo isocyanates or polyisocyanates which can be prepared from the abovementioned diisocyanates or polyisocyanates or mixtures thereof by linkage via urethane, allophanate, urea, biuret, uretdione, amide, isocyanurate, carbodiimide, uretonimine, oxadiazinetrione or iminooxadiazinedione structures. It is of course also possible to use mixtures of the isocyanates mentioned.

In step 1), the diols or polyols and diisocyanates or polyisocyanates are selected so that the addition product has, on average, one isocyanate group and more than one hydroxyl group or one hydroxyl group and more than one isocyanate group. When mixed diols or polyols or mixed diisocyanates or polyisocyanates are used, product mixtures are obtained. The expression "on average" refers to these. Both the amounts and the functionalities of the diols or polyols and diisocyanates or polyisocyanates are chosen according to these requirements. An appropriate choice is known to those skilled in the art. Preference is given to reacting diols with polyisocyanates or polyols with diisocyanates in step 1).

In step 2) of the process of the present invention, the addition product from step 1) is reacted further by intermolecular reaction of the hydroxyl groups with the isocyanate groups to form a polyaddition product.

As an alternative, the addition product can also firstly be reacted with a compound containing at least two hydroxyl groups or isocyanate groups (starter molecule). If a reaction with the starter molecule containing at least two hydroxyl groups, mercapto groups, amino groups or isocyanate groups is carried out first, dendritic polyurethanes are obtained in a stepwise preparation. If the reaction with the starter compound is omitted, hyperbranched polyurethanes are obtained.

However, it is also possible, in a step 3), to react the polyaddition product from step 2) with a compound containing at least two hydroxyl groups, mercapto groups, amino groups or isocyanate groups (starter). This variant corresponds to the convergent preparation of dendrimers, in which a reaction with a corresponding starter compound has not been carried out initially in step 2).

To obtain defined structures in the preparation of the dendritic polyamino urethanes, it is necessary to use at least that number of monomer molecules which allows each free functional group of the polymer to react. At the beginning of the reaction, the reaction vessel is usually initially charged with a polyfunctional molecule, referred to as starter molecule or initiator core, onto whose functional groups a molecule which is reactive toward the particular functional group is in each case added. This is followed, if necessary, by removal of the unreacted monomers and purification of the intermediate. A polyfunctional monomer is then once again added onto each free functional group of the intermediate and, if necessary, the removal of the excess monomers and purification are then carried out, and the procedure is continued until the desired molecular weight has been reached or addition of further monomers is no longer possible for stearic reasons. The individual intermediates are also referred to as generations, with the intermediate formed by addition of monomers onto the starter molecule being referred to as the first generation, the next intermediate being referred to as the second generation, and so forth. The differing reactivities of the functional groups of the monomers used ensures that in each case the most reactive functional groups react with the end groups of the dendron chains and the less reactive functional groups of the monomers form the functional end groups of the next generation of the dendritic polyamino urethanes.

In a preferred embodiment of the invention, the dendritic polyamino urethanes are prepared by reacting 2, 3 or 4 mol of a diisocyanate with one mole of a bifunctional, trifunctional or tetrafunctional starter molecule, which may be a bifunctional, trifunctional or tetrafunctional alcohol or polyamino alcohol, to form the isocyanate-terminated first generation of the dendritic polyamino urethane.

In the next reaction step, the free isocyanate groups of the first generation react selectively with the more reactive OH group of the amino alcohol added to form the OH-terminated second dendrimer generation. The OH groups of this generation are in turn reacted with the diisocyanate as in the preparation of the first generation of the dendritic polyamino urethane, and so forth. In this way, it is possible to produce dendritic polyamino urethanes whose functionality is doubled in each generation. The functionality can be determined either by OH groups or NCO groups. This method of shell-like construction of the dendrimer molecule is also referred to as the "divergent method".

It is likewise possible to construct dendrimers by the "convergent method": here, defined arms of the dendrimer, viz. the dendrons, are firstly built up and are then attached to the core or starter molecule in the last reaction step.

The reaction can be carried out in bulk or in solvents and in the presence or absence of a urethane formation catalyst. If necessary, excess monomers can be separated off and/or a purification step can be carried out between the reaction stages.

The synthesis of a hyperbranched polyamino urethane is carried out, for example, by addition of a substance containing reactive double bonds onto a dialkanolamine in a Michael addition. The reaction of 2-hydroxyethyl acrylate with diisopropanolamine may be mentioned as an example. The first reaction step forms an amino alcohol having a tertiary amino group, two secondary (slow reacting) OH groups and one primary (fast reacting) OH group. This molecule is then reacted with diisocyanate as illustrated in scheme 1 to form an AB$_2$ molecule which then reacts intermolecularly to give the hyperbranched OH-terminated polyaminourethane.

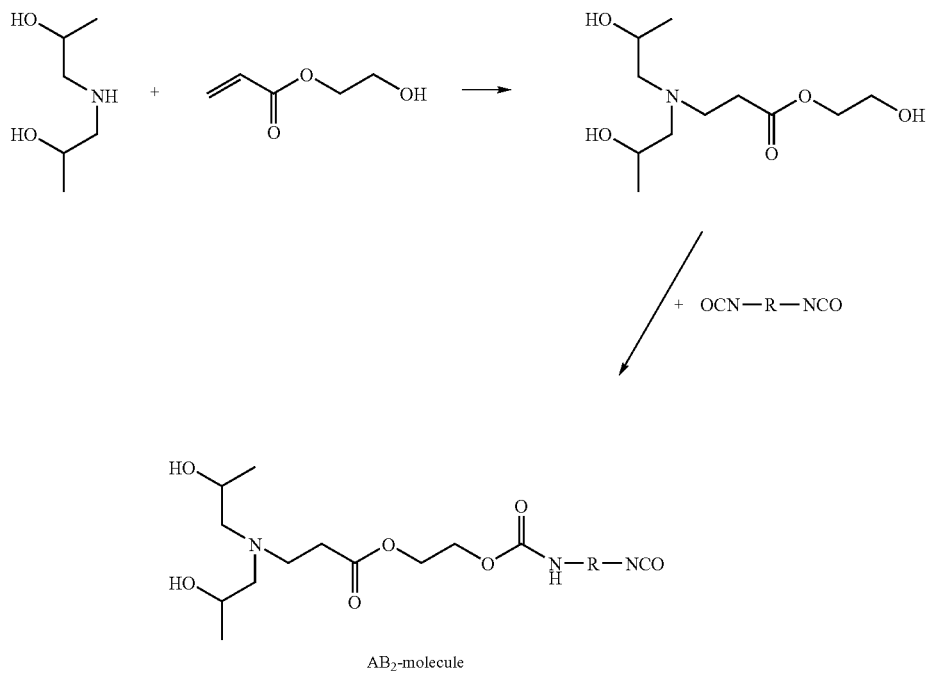

Scheme 1: Reaction scheme for the synthesis of an OH-terminated hyperbranched polyamino urethane -continued

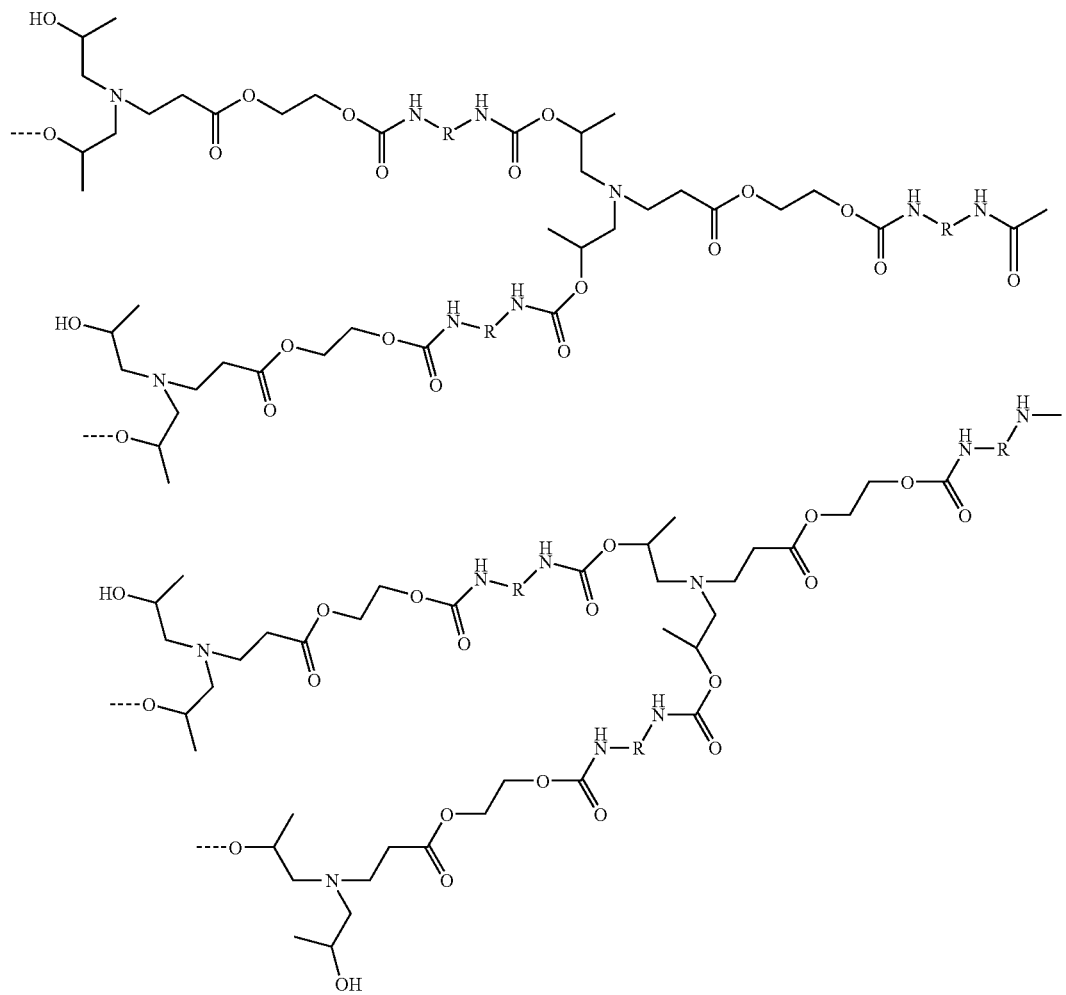

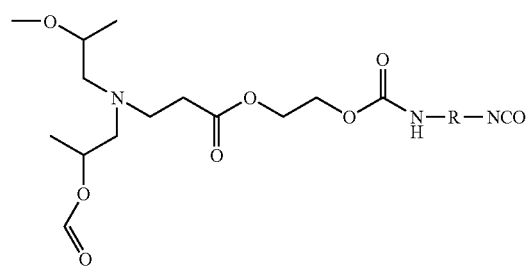

The polyaddition reaction can be continued to give very high molecular weight structures. After the desired molecular weight has been reached, the focal (i.e. terminal) NCO group can be "stopped" by addition of a monofunctional compound, e.g. by addition of an amino alcohol or by means of a monoamine or a monoalcohol.

It is also possible to add a bifunctional or polyfunctional compound containing OH and/or NH groups, in which case the hyperbranched polymer arms then add onto the polyfunctional compound in the manner of a "convergent method" and the molar mass increases considerably.

It is likewise possible to produce OH-terminated hyperbranched products by, for example, adding molecules containing two activated double bonds onto a primary amine. Scheme 2 shows the preparation of such a species, using the reaction of ethanolamine with hydroxypropyl acrylate as an example.

Scheme 2: Reaction scheme for the synthesis of an OH-terminated hyperbranched polyaminourethane
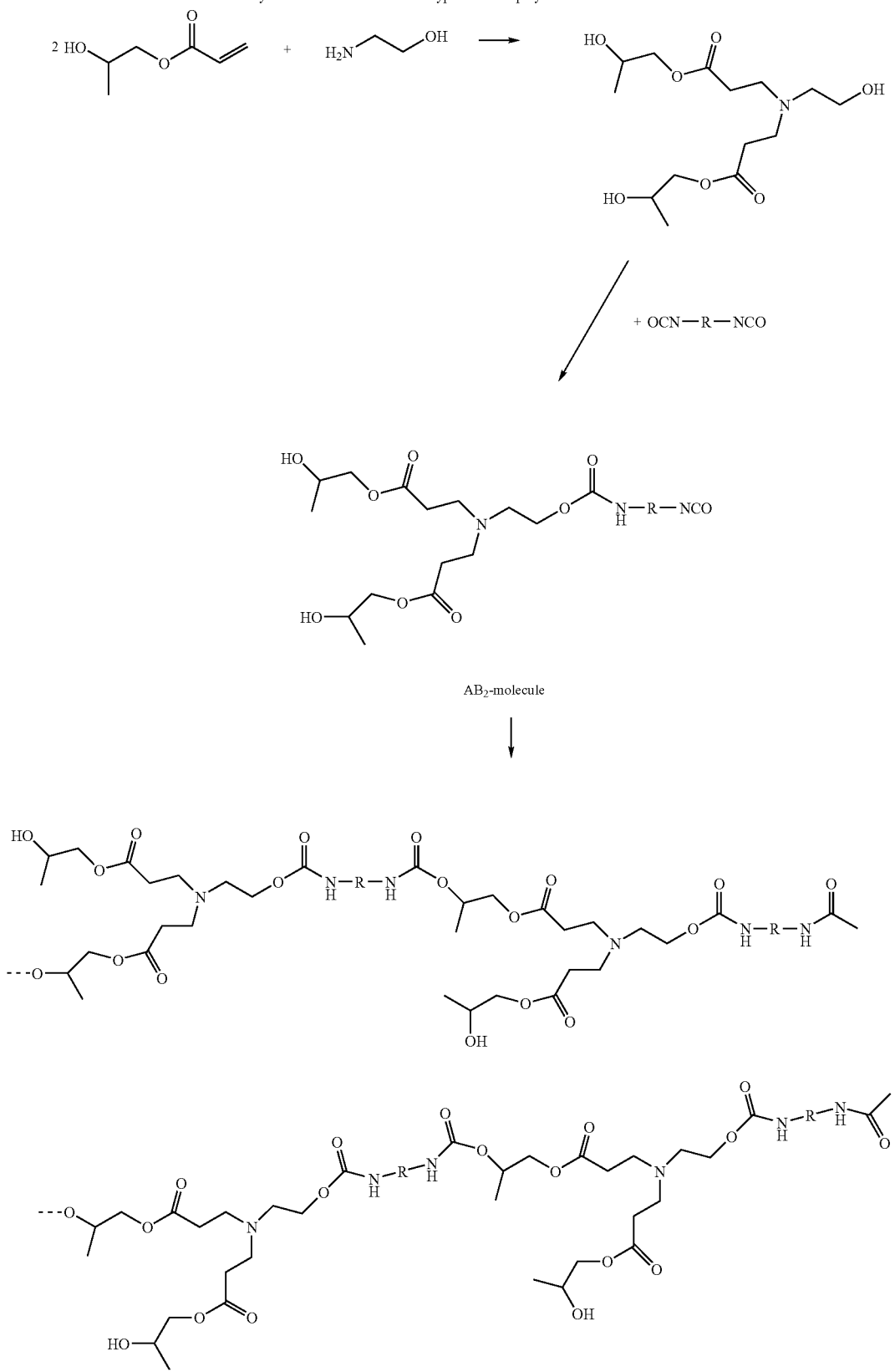

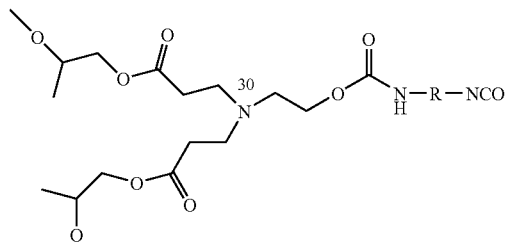

Conversely, hyperbranched polyisocyanates can also be prepared in an analogous fashion by, for example, reacting diethanolamine with 2-hydroxypropyl acrylate. This forms an amino alcohol molecule having two primary OH groups and one secondary OH group. If one mole of this product is reacted with two mol of diisocyanate, the result is an A$_2$B building block which then reacts to form a hyperbranched polyisocyanate (scheme 3).

Scheme 3: Preparation of a hyperbranched polyisocyanate

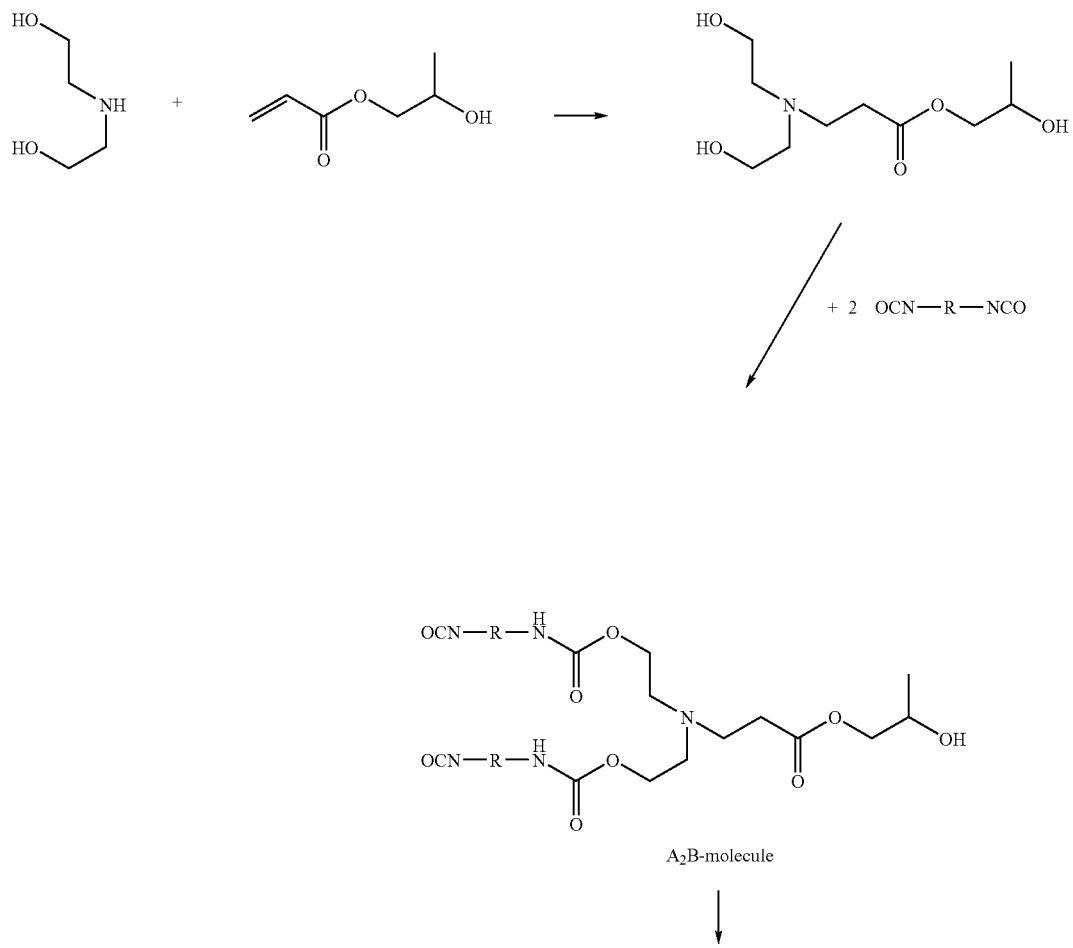

A$_2$B-molecule

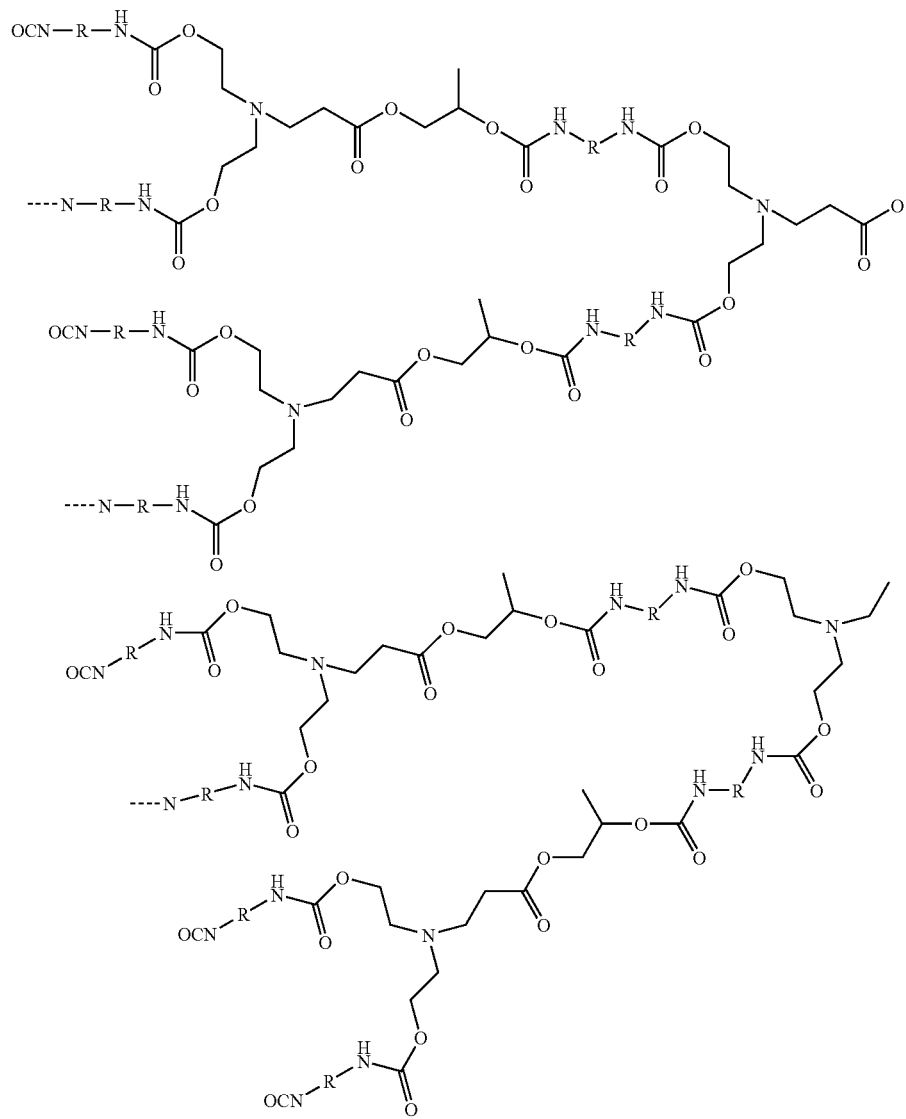
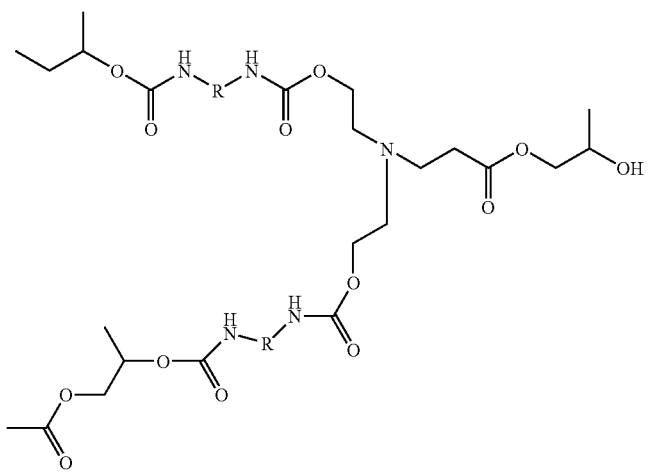

Trifunctional and higher-functional isocyanates and also compounds having four or more OH groups can also be reacted in an analogous way.

After the desired molecular weight had been reached, the focal, terminal, OH group can be blocked by addition of the diisocyanate used in the reaction or by addition of a monofunctional compound, e.g. a monoisocyanate or a derivative of an organic carboxylic acid, e.g. an acid halide or an anhydride.

As an alternative, the reaction can also be stopped by addition of another diisocyanate or a diacid derivative. The addition of a higher-functional compound containing NCO or acid derivative groups is also possible. In this case, the hyperbranched polymer arms then add onto the polyfunctional compound in the manner of a "convergent method" and the molar mass increases considerably.

The present invention also provides the dendritic or hyperbranched polyurethanes obtainable by the process of the present invention. These dendritic or hyperbranched polyurethanes preferably have from at least 3 to 100, particularly preferably from at least 3 to 50, in particular from at least 3 to 20, terminal hydroxyl and/or isocyanate groups. Their molecular weight is preferably from 200 to 100000, particularly preferably from 500 to 50000 (number average).

If required, the functional groups of the dendritic or highly branched polyamino urethanes can be modified or made inert. Thus, NCO-terminated polymers can be reacted completely or partially with, for example, fatty alcohols, fatty amines or monoalcohols containing double bonds, e.g. hydroxyethyl acrylate, hydroxyethyl methacrylate, hydroxybutyl acrylate, vinyl alcohol or allyl alcohol. Furthermore, the isocyanate groups can also be reversibly blocked by capping agents known from the prior art. Customary capping agents for NCO groups include, for example, phenols, imidazoles, pyrazoles, pyrazolinones, oximes, diketopiperazines, caprolactam, malonic esters or compounds described in the publications by Z. W. Wicks, Prog. Org. Coat. 3 (1975) 73-99 and Prog. Org. Coat. 9 (1981), 3-28, and in Houben-Weyl, Methoden der Organischen Chemie, vol. XIV/2, page 61 ff., Georg Thieme Verlag, Stuttgart 1963.

Hydroxyl-terminated polymers can, for example, be made inert by reaction with monocarboxylic acids, for example fatty acids, or monoisocyanates and/or be functionalized by means of acrylic acids. They can be chain-extended by addition of alkylene oxides such as ethylene oxide, propylene oxide and/or butylene oxide.

The polymers can be made water-soluble or water-dispersible by introduction of CH-acid components, e.g. of inorganic or organic protic acids.

The tertiary amino groups of the compounds can, if desired, be quaternized and thus made permanently cationic by means of alkylating agents such as dimethyl sulfate, diethyl sulfate, methyl iodide, methyl bromide or benzyl chloride.

The reaction can in each case be carried out in the absence of solvent, but is preferably carried out in solution. Possible solvents are all compounds which are liquid at the reaction temperature and are inert toward the monomers and the end products.

The dendritic and hyperbranched polyamino urethanes of the present invention are used, for example, as crosslinkers for polyurethane systems or as building blocks for other polyaddition or polycondensation polymers. Further possible uses are as phase compatibilizers, Theological aids, thixotropes, nucleating agents or as carriers for active compounds or as catalyst support.

The process of the present invention allows dendritic and highly branched polyaminourethanes to be prepared from readily available raw materials in a simple fashion, in particular without the complicated introduction of protective groups.

The process of the present invention is illustrated by the following examples.

EXAMPLES 1a-1d

Preparation of Amino Alcohols by Michael Addition

The amino alcohol is placed in a reaction vessel provided with a stirrer, dropping funnel with pressure equilibration and gas inlet tube while passing dry nitrogen through the vessel and the alcohol is heated to 50° C. At this temperature, the equivalent amount of the acrylate (cf. Table 1) is then added slowly. After the addition is complete, the reaction mixture is stirred at 50° C. for another 3 hours. The reaction product is subsequently cooled to room temperature and stored under dry nitrogen.

TABLE 1

Amino alcohols

| Example No. | Amino alcohol | Acrylate | Molar ratio |
|---|---|---|---|
| 1a | Diisopropanolamine (DIPA) | 2-hydroxyethyl acrylate (HEA) | 1:1 |
| 1b | DIPA | 4-hydroxybutyl acrylate (HBA) | 1:1 |
| 1c | Diethanolamine (DEA) | 2-hydroxypropyl acrylate (HPA) | 1:1 |
| 1d | Ethanolamine | HPA | 1:2 |

EXAMPLES 2a-2i

Hyperbranched, OH-Terminated Polyamino Urethanes

The amino alcohol from Table 1 is placed in a reaction vessel provided with a stirrer, dropping funnel with pressure equilibration and gas inlet tube while passing dry nitrogen through the vessel and the alcohol is admixed with dry methyl ethyl ketone (MEK). The amount of solvent is chosen so that a 30% strength solution of the reaction mixture in MEK results after addition of the isocyanate. The solution of amino alcohol in MEK is then cooled to 0° C., the equivalent amount of the isocyanate (cf. Table 2) is added over a period of 45 minutes and the mixture is subsequently stirred at 0° C. for another 30 minutes. The temperature is then increased to the value indicated in Table 2, dibutyltin dilaurate (DBTL, cf. Table 2) is added if applicable and the reaction is carried out for the period indicated in Table 2. To stop the reaction, an excess of ethanol is added in order to neutralize remaining NCO groups. The solvents are subsequently removed at 80° C. under reduced pressure on a rotary evaporator. GPC analysis was carried out using dimethylacetamide as mobile phase and polymethyl methacrylate as standard.

TABLE 2

Hyperbranched, OH-terminated polyaminourethanes

| Example No. | Amino alcohol from Table 1 | Isocyanate | Molar ratio | Reactions temperature (° C.) | DBTL (ppm) | Reaction time(h) | Molecular weight $M_n$ (GPC) | Molecular weight $M_w$ (GPC) |
|---|---|---|---|---|---|---|---|---|
| 2a | 1a | TDI | 1:1 | 50 | — | 0.5 | 3757 | 8856 |
| 2b | 1a | IPDI | 1:1 | 80 | — | 20 | 5715 | 24850 |
| 2c | 1b | TDI | 1:1 | 50 | 200 | 8 | 7255 | 47035 |
| 2d | 1b | IPDI | 1:1 | 80 | 200 | 10 | 4944 | 14833 |
| 2e | 1b | HDI | 1:1 | 80 | 200 | 10 | 8135 | 73156 |
| 2f | 1b | HDI | 1:1 | 80 | 200 | 2 | 3785 | 9615 |
| 2g | 1b | IPDI | 1:1 | 80 | 200 | 4 | 2771 | 5199 |
| 2h | 1b | TDI | 1:1 | 80 | — | 2 | 4630 | 13245 |
| 2i | 1d | TDI | 1:1 | 50 | — | 1 | 3671 | 7991 |

EXAMPLE 3

Hyperbranched, NCO-Terminated Polyamino Urethane 70 g of amino alcohol 1 c from Table 1 are placed in a reaction vessel provided with a stirrer, dropping funnel with pressure equilibration and gas inlet tube while passing dry nitrogen through the vessel and are admixed with 470 g of dry methyl ethyl ketone (MEK). The solution is then cooled to 0° C., 132.3 g of isophorone diisocyanate are added over a period of 45 minutes and the mixture is stirred at 0° C. for another 30 minutes. The temperature is then increased to 70° C. and the mixture is stirred for 20 hours. To stop the reaction, 1 g of Basonat® HI 100 is added and the mixture is stirred at 70° C. for another one hour. The solvent is subsequently removed at 80° C. under reduced pressure on a rotary evaporator.

GPC analysis using dimethylacetamide as mobile phase and polymethyl methacrylate as standard gave the following mean molecular weights:

$M_n$=4280, $M_w$=27000.

Isocyanates, abbreviations:

| TDI: | Tolylene 2,4-diisocyanate |
|---|---|
| IPDI: | Isophorone diisocyanate |
| HDI: | Hexamethylene diisocyanate |

Basonat® HI 100 (BASF AG): polyisocyanate based on HDI, mean functionality=3.7

We claim:

1. A process for preparing dendritic or hyperbranched polyurethanes by 1) reacting diols or polyols having at least one tertiary nitrogen atom and at least two hydroxyl groups of differing reactivity toward isocyanate groups with diisocyanates or polyisocyanates to form an addition product, with the diols or polyols and diisocyanates or polyisocyanates being selected so that the addition product has, on average, one isocyanate group and more than one hydroxyl group or one hydroxyl group and more than one isocyanate group, 2) converting the addition product from step 1) into a polyaddition product by intermolecular reaction of the hydroxyl groups with the isocyanate groups, and with a reaction with a compound containing at least two hydroxyl groups, mercapto groups, amino groups or isocyanate groups also being able to be carried out first, 3) if desired reacting the polyaddition product from step 2) with a compound containing at least two hydroxyl groups, mercapto groups, amino groups or isocyanate groups wherein only or predominantly the hydroxyl groups of the diols or polyols having the higher reactivity toward isocyanate groups are reacted with the isocyanate groups in step 1) and the hydroxyl groups of the diols or polyols having the lower reactivity toward isocyanate groups are reacted in step 2).

2. A process as claimed in claim 1, wherein the diols are reacted with polyisocyanates or polyols are reacted with diisocyanates in step 1).

3. The process as claimed in claim 1, wherein the diols or polyols used in step 1) are aliphatic.

4. The process as claimed in claim 1, wherein the diols or polyols used in step 1) are obtained by Michael addition of compounds having at least one primary or secondary amino group and at least one hydroxyl group onto ethylenically unsaturated compounds having at least one hydroxyl group.

5. A process as claimed in claim 4, wherein the ethylenically unsaturated compound is selected from among (meth) acrylates of diols or polyols, vinyl alcohols and allyl alcohols.

6. A process as claimed in claim 5, wherein the ethylenically unsaturated compound is a (meth)acrylate of an aliphatic diol which is reacted with an aliphatic amino alcohol which has one primary or secondary amino group and one, two or three hydroxyl groups.

7. A dendritic or hyperbranched polyurethane obtainable by the process of claim 1.

8. A dendritic or hyperbranched polyurethane as claimed in claim 7, which has, on average, at least three terminal hydroxyl and/or isocyanate groups.

9. A process for producing polyaddition or polycondensation polymers, coatings, paints and varnishes, adhesives, sealants, casting elastomers and foams and as phase compatibilizers, rheological aids, thixotropes, nucleating agents or as carriers for active compounds or as catalyst support comprising reacting the dendritic or hyperbranched polyurethane of claim 7.

10. The process as claimed in claim 2, wherein the diols or polyols used in step 1) are aliphatic.

11. The process of claim 2, wherein the diols or polyols used in step 1) are obtained by Michael addition of compounds having at least one primary or secondary amino group and at least one hydroxyl group onto ethylenically unsaturated compounds having at least one hydroxyl group.

12. The process of claim 3, wherein the diols or polyols used in step 1) are obtained by Michael addition of compounds having at least one primary or secondary amino group and at least one hydroxyl group onto ethylenically unsaturated compounds having at least one hydroxyl group.

13. A dendritic or hyperbranched polyurethane obtained by the process of claim 2.

14. A dendritic or hyperbranched polyurethane obtained by the process of claim 3.

* * * * *